United States Patent
Yaldo et al.

(10) Patent No.: US 10,124,804 B2
(45) Date of Patent: Nov. 13, 2018

(54) METHOD AND APPARATUS FOR TRAFFIC CONTROL DEVICE DETECTION OPTIMIZATION

(71) Applicant: GM GLOBAL TECHNOLOGY OPERATIONS LLC, Detroit, MI (US)

(72) Inventors: Valor Yaldo, West Bloomfield, MI (US); Xiaofeng Song, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 86 days.

(21) Appl. No.: 15/485,841

(22) Filed: Apr. 12, 2017

(65) Prior Publication Data

US 2018/0297598 A1 Oct. 18, 2018

(51) Int. Cl.
| | |
|---|---|
| *B60W 30/18* | (2012.01) |
| *G06K 9/00* | (2006.01) |
| *B60W 10/04* | (2006.01) |
| *B60W 10/18* | (2012.01) |
| *B60W 30/16* | (2012.01) |
| *G08G 1/095* | (2006.01) |
| *G01S 19/13* | (2010.01) |
| *H04L 29/08* | (2006.01) |

(52) U.S. Cl.
CPC ...... *B60W 30/18154* (2013.01); *B60W 10/04* (2013.01); *B60W 10/18* (2013.01); *B60W 30/16* (2013.01); *G06K 9/00825* (2013.01); *G08G 1/095* (2013.01); *B60W 2420/40* (2013.01); *B60W 2420/42* (2013.01); *B60W 2420/52* (2013.01); *B60W 2550/308* (2013.01); *B60W 2710/18* (2013.01); *B60W 2720/106* (2013.01); *B60W 2750/40* (2013.01); *G01S 19/13* (2013.01); *H04L 67/12* (2013.01)

(58) Field of Classification Search
CPC ............ B60W 30/18154; B60W 10/04; G06K 9/00825

See application file for complete search history.

(56) References Cited

U.S. PATENT DOCUMENTS

2018/0012088 A1* 1/2018 Matsuo .................. G01O 21/26

* cited by examiner

*Primary Examiner* — Basil T. Jos

(57) ABSTRACT

A method and apparatus for optimizing traffic control device detection are provided. The method includes: determining whether a first vehicle is traveling to an intersection with a traffic control device and whether the first vehicle is within a predetermined distance of the intersection; in response to determining that the first vehicle is traveling to the intersection with the traffic control device and that the first vehicle is within the first predetermined distance of the intersection, scanning for the traffic control device; controlling the first vehicle to increase a distance between the first vehicle and a second vehicle in front of the first vehicle if the scanning fails to detect the traffic control device; and controlling the first vehicle to maintain the distance between the first vehicle and the second vehicle in front of the first vehicle if the scanning detects the traffic control device.

20 Claims, 3 Drawing Sheets

METHOD AND APPARATUS FOR TRAFFIC CONTROL DEVICE DETECTION OPTIMIZATION

INTRODUCTION

Apparatuses and methods consistent with exemplary embodiments relate to detecting traffic control devices. More particularly, apparatuses and methods consistent with exemplary embodiments relate detecting traffic control devices and controlling a vehicle according to a signal of the detected traffic control device.

SUMMARY

One or more exemplary embodiments provide a method and an apparatus that determine whether a vehicle is approaching an intersection with a traffic control device. More particularly, one or more exemplary embodiments provide a method and an apparatus that scan for a traffic control device near an intersection with a traffic control device, and control a vehicle based on a distance from the intersection, a height of a vehicle in front of the vehicle, and whether a traffic control device is detected by the scan.

According to an aspect of an exemplary embodiment, a method for optimizing traffic control device detection is provided. The method includes determining whether a first vehicle is traveling to an intersection with a traffic control device and whether the first vehicle is within a predetermined distance of the intersection, in response to determining that the first vehicle is traveling to the intersection with the traffic control device and that the first vehicle is within the first predetermined distance of the intersection, scanning for the traffic control device, controlling the first vehicle to increase a distance between the first vehicle and a second vehicle in front of the first vehicle if the scanning fails to detect the traffic control device, and controlling the first vehicle to maintain the distance between the first vehicle and the second vehicle in front of the first vehicle if the scanning detects the traffic control device.

The method may further include controlling the first vehicle to stop the first vehicle at the intersection if the scanning fails to detect the traffic control device and the first vehicle is within a second predetermined distance of the intersection.

The method may further include detecting a height of the second vehicle in front of the first vehicle, and the controlling the first vehicle to increase the distance between the first vehicle and the second vehicle may include increasing the distance between the first vehicle and second vehicle based on the height of the second vehicle.

The controlling the first vehicle to increase the distance between the first vehicle and the second vehicle may include increasing the distance between the first vehicle and second vehicle at a rate based on a distance between the first vehicle and the intersection.

The scanning for the traffic control device may include detecting a traffic control device in an image of taken by a vehicle sensor.

The controlling the first vehicle to increase the distance between the first vehicle and the second vehicle in front of the first vehicle if the scanning fails to detect the traffic control device may include decelerating the first vehicle.

The decelerating the first vehicle may include performing at least one from among initiating a brake of the first vehicle, releasing a throttle of the first vehicle, or decreasing a power output of the first vehicle.

The method may further include detecting a height of the traffic control device, and the controlling the first vehicle to increase the distance between the first vehicle and the second vehicle may include increasing the distance between the first vehicle and second vehicle based on the height of the traffic control device.

The determining whether the first vehicle is traveling to the intersection with the traffic control device and whether the first vehicle is within the predetermined distance of the intersection may include receiving location information of the first vehicle, determining a heading of the first vehicle, comparing the location information to map information including the location of the traffic control device, and determining that the first vehicle is traveling to the intersection with the traffic control device and that the first vehicle is within the predetermined distance based on the determined heading of the first vehicle and the comparing of the location information to the map information.

According to an aspect of an exemplary embodiment, an apparatus that optimizes traffic control device detection, the apparatus comprising: at least one memory comprising computer executable instructions; and at least one processor configured to read and execute the computer executable instructions. The computer executable instructions cause the at least one processor to: determine whether a first vehicle is traveling to an intersection with a traffic control device and whether the first vehicle is within a predetermined distance of the intersection, in response to determining that the first vehicle is traveling to the intersection with the traffic control device and that the first vehicle is within the first predetermined distance of the intersection, scan for the traffic control device, control the first vehicle to increase a distance between the first vehicle and a second vehicle in front of the first vehicle if the scanning fails to detect the traffic control device, and control the first vehicle to maintain the distance between the first vehicle and the second vehicle in front of the first vehicle if the scanning detects the traffic control device The computer executable instructions may further cause the at least one processor to control the first vehicle to stop the first vehicle at the intersection if the scanning fails to detect the traffic control device and the first vehicle is within a second predetermined distance of the intersection.

The computer executable instructions may further cause the at least one processor to detect a height of the second vehicle in front of the first vehicle, and to control the first vehicle to increase the distance between the first vehicle and the second vehicle by increasing the distance between the first vehicle and second vehicle based on the height of the second vehicle.

The computer executable instructions may further cause the at least one processor to control the first vehicle to increase the distance between the first vehicle and the second vehicle by increasing the distance between the first vehicle and second vehicle at a rate based on a distance between the first vehicle and the intersection.

The computer executable instructions may further cause the at least one processor to scan for the traffic control device by detecting a traffic control device in an image of taken by a vehicle sensor.

The computer executable instructions may further cause the at least one processor to control the first vehicle to increase the distance between the first vehicle and the second vehicle in front of the first vehicle if the scanning fails to detect the traffic control device by decelerating the first vehicle.

The computer executable instructions may further cause the at least one processor to decelerate the first vehicle by performing at least one from among initiating a brake of the first vehicle, releasing a throttle of the first vehicle, or decreasing a power output of the first vehicle.

The computer executable instructions may further cause the at least one processor to control the first vehicle to maintain the distance between the first vehicle and the second vehicle in front of the first vehicle if the scanning detects the traffic control device by stopping the vehicle if the traffic control device indicates a yellow signal and the vehicle is within a third predetermined distance from the intersection.

The computer executable instructions may further cause at least one processor to determine whether the first vehicle is traveling to the intersection with the traffic control device and whether the first vehicle is within the predetermined distance of the intersection by receiving location information of the first vehicle, determining a heading of the first vehicle, comparing the location information to map information including the location of the traffic control device, and determining that the first vehicle is traveling to the intersection with the traffic control device and that the first vehicle is within the predetermined distance based on the determined heading of the first vehicle and the comparing of the location information to the map information.

The computer executable instructions may further cause the computer executable instructions further cause the at least one processor to detect a height of the traffic control device and the at least one processor to control the first vehicle to increase the distance between the first vehicle and the second vehicle by increasing the distance between the first vehicle and second vehicle based on the height of the traffic control device.

Other objects, advantages and novel features of the exemplary embodiments will become more apparent from the following detailed description of exemplary embodiments and the accompanying drawings.

DETAILED DESCRIPTION OF EXEMPLARY EMBODIMENTS

Figure 1:
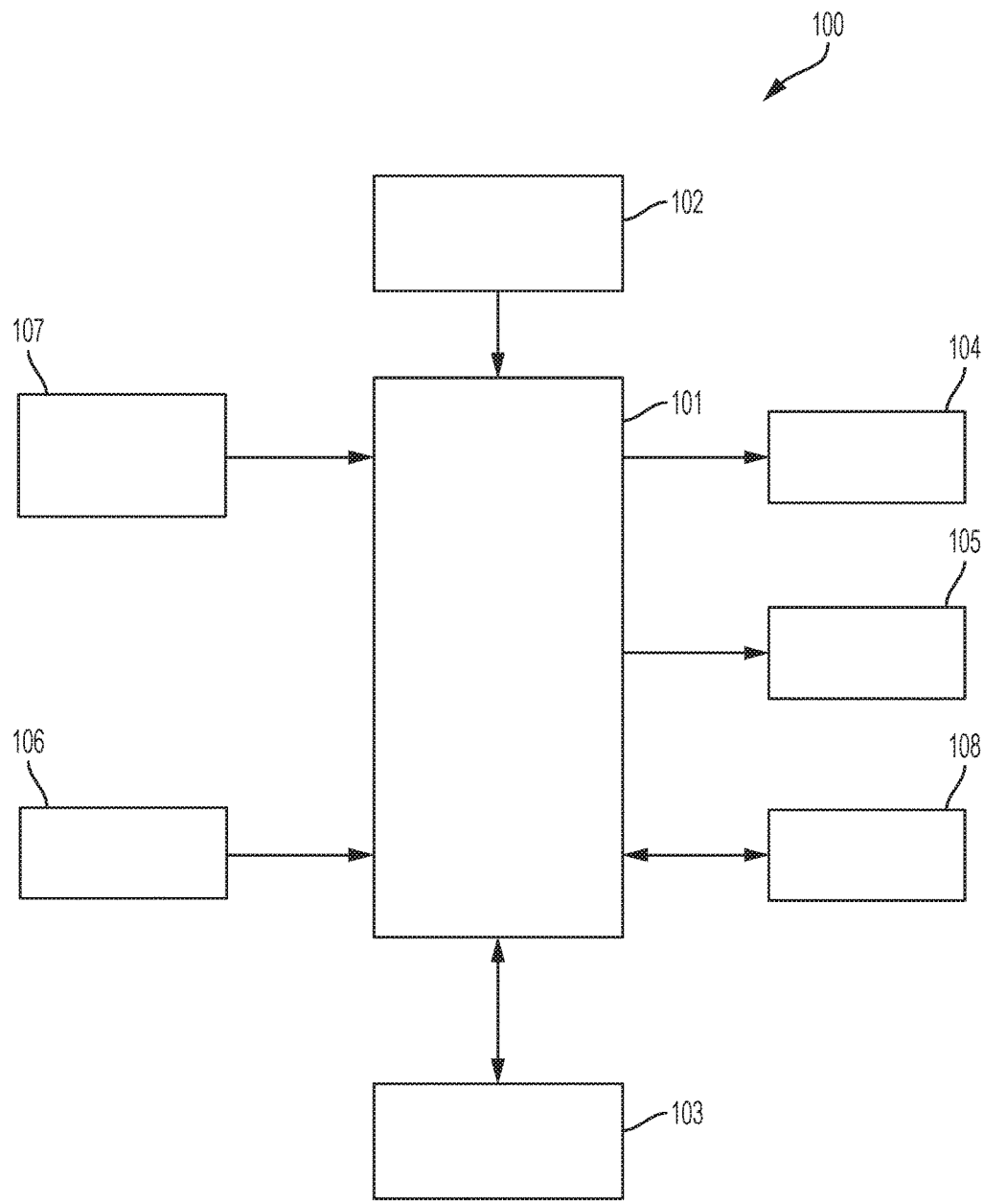
FIG. 1 shows a block diagram of an apparatus that optimizes traffic control device detection according to an exemplary embodiment.

An apparatus and method for optimizing traffic control device detection will now be described in detail with reference to FIGS. 1-3 of the accompanying drawings in which like reference numerals refer to like elements throughout.

The following disclosure will enable one skilled in the art to practice the inventive concept. However, the exemplary embodiments disclosed herein are merely exemplary and do not limit the inventive concept to exemplary embodiments described herein. Moreover, descriptions of features or aspects of each exemplary embodiment should typically be considered as available for aspects of other exemplary embodiments.

It is also understood that where it is stated herein that a first element is "connected to," "attached to," "formed on," or "disposed on" a second element, the first element may be connected directly to, formed directly on or disposed directly on the second element or there may be intervening elements between the first element and the second element, unless it is stated that a first element is "directly" connected to, attached to, formed on, or disposed on the second element. In addition, if a first element is configured to "send" or "receive" information from a second element, the first element may send or receive the information directly to or from the second element, send or receive the information via a bus, send or receive the information via a network, or send or receive the information via intermediate elements, unless the first element is indicated to send or receive information "directly" to or from the second element.

Throughout the disclosure, one or more of the elements disclosed may be combined into a single device or into one or more devices. In addition, individual elements may be provided on separate devices.

Vehicles are being equipped with sensors that are capable of detecting conditions of an environment around a vehicle. The sensors provide information on conditions that exist in the environment and this information may be used to control the vehicle or to assist an operator of a vehicle. One such sensor may be configured to detect a traffic control device. Often times, the detection of the traffic control device by such a sensor may be impeded by the presence of a vehicle that obstructs the sensor's field of view. For example, a truck traveling in front of a car may prevent a sensor on the car from detecting the traffic control device.

To address the above issue, parameters may be determined and used to control the vehicle and/or the sensor to optimize the detection of the traffic control device or other object. Such parameters may include one or more of a distance from the intersection, a height of a vehicle in front of the vehicle, a height of a traffic control device, and a parameter in whether a traffic control device or object is detected by the scan. For example, a vehicle may be controlled to increase the distance between the vehicle and another vehicle in front of the vehicle in order to facilitate the detection of the traffic control device by the sensor.

FIG. 1 shows a block diagram of an apparatus that optimizes traffic control device detection 100 according to an exemplary embodiment. As shown in FIG. 1, the apparatus that that optimizes traffic control device detection 100, according to an exemplary embodiment, includes a controller 101, a power supply 102, a storage 103, an output 104, a vehicle drive controller 105, a user input 106, a traffic light detection sensor 107, and a communication device 108. However, the apparatus that that optimizes traffic control device detection 100 is not limited to the aforementioned configuration and may be configured to include additional elements and/or omit one or more of the aforementioned elements. The apparatus that that optimizes traffic control device detection 100 may be implemented as part of a vehicle, as a standalone component, as a hybrid between an on vehicle and off vehicle device, or in another computing device.

The controller 101 controls the overall operation and function of the apparatus that that optimizes traffic control device detection 100. The controller 101 may control one or more of a storage 103, an output 104, a vehicle drive controller 105, a user input 106, a traffic light detection sensor 107, and a communication device 108 of the apparatus that that optimizes traffic control device detection 100. The controller 101 may include one or more from among a processor, a microprocessor, a central processing unit (CPU), a graphics processor, Application Specific Integrated Circuits (ASICs), Field-Programmable Gate Arrays (FPGAs), state machines, circuitry, and a combination of hardware, software and firmware components.

The controller 101 is configured to send and/or receive information from one or more of the storage 103, the output 104, the vehicle drive controller 105, the user input 106, the traffic light detection sensor 107, and the communication device 108 of the apparatus that that optimizes traffic control device detection 100. The information may be sent and received via a bus or network, or may be directly read or written to/from one or more of the storage 103, the output 104, the user input 106, the traffic light detection sensor 107, and the communication device 108 of the apparatus that that optimizes traffic control device detection 100. Examples of suitable network connections include a controller area network (CAN), a media oriented system transfer (MOST), a local interconnection network (LIN), a local area network (LAN), wireless networks such as Bluetooth and 802.11, and other appropriate connections such as Ethernet.

The power supply 102 provides power to one or more of the controller 101, the storage 103, the output 104, the vehicle drive controller 105, the user input 106, the traffic light detection sensor 107, and the communication device 108, of the apparatus that that optimizes traffic control device detection 100. The power supply 102 may include one or more from among a battery, an outlet, a capacitor, a solar energy cell, a generator, a wind energy device, an alternator, etc.

The storage 103 is configured for storing information and retrieving information used by the apparatus that that optimizes traffic control device detection 100. The storage 103 may be controlled by the controller 101 to store and retrieve information received from the controller 101, the traffic light detection sensor 107, and/or the communication device 108. The information may include information on a location/or position of a traffic control device, information on a location of a vehicle, mapping information including information on a location of an intersection, etc. The storage 103 may also include the computer instructions configured to be executed by a processor to perform the functions of the apparatus that that optimizes traffic control device detection 100.

The storage 103 may include one or more from among floppy diskettes, optical disks, CD-ROMs (Compact Disc-Read Only Memories), magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, cache memory, and other type of media/machine-readable medium suitable for storing machine-executable instructions.

The output 104 outputs information in one or more forms including: visual, audible and/or haptic form. The output 104 may be controlled by the controller 101 to provide outputs to the user of the apparatus that optimizes traffic control device detection 100. The output 104 may include one or more from among a speaker, an audio device, a display, a centrally-located display, a head up display, a windshield display, a haptic feedback device, a vibration device, a tactile feedback device, a tap-feedback device, a holographic display, an instrument light, an indicator light, etc.

The output 104 may output notification including one or more from among an audible notification, a light notification, and a display notification. The notifications may indicate the status of the traffic control device and/or may indicate whether the traffic control device is detected. In addition, the output 104 may output instructions on how to operate a vehicle based on the detected status of the traffic control device. For example, the output 104 may instruct an operator to slow down a vehicle or stop a vehicle The vehicle drive controller 105 may be one configured to control one or more from a trajectory of a vehicle, a speed of a vehicle, acceleration/deceleration of a vehicle. For example, the vehicle controller 105 may be configured to adjust the throttle, adjust the power going to a motor, adjust the fuel being injected into a combustion chamber, and/or initiate a brake to control a speed of a vehicle. In another example, the vehicle controller 105 may be configured to change the trajectory of the vehicle by controlling the steering of a vehicle via electric or hydraulic motor configured to control to rotate or turn the wheels.

The user input 106 is configured to provide information and commands to the apparatus that that optimizes traffic control device detection 100. The user input 106 may be used to provide user inputs, etc., to the controller 101. The user input 106 may include one or more from among a touchscreen, a keyboard, a soft keypad, a button, a motion detector, a voice input detector, a microphone, a camera, a trackpad, a mouse, a steering wheel, a touchpad, etc. The user input 106 may be configured to receive a user input to acknowledge or dismiss the notification output by the output 104. The user input 106 may also be configured to receive a user input to activate traffic control device detection using the apparatus that that optimizes traffic control device detection 100. The user input may 106 may also be configured to receive a user input to control the vehicle.

The traffic light detection sensor 107 may include one or more from among a plurality of sensors including a camera, a laser sensor, an ultrasonic sensor, an infrared camera, a LIDAR, a radar sensor, an ultra-short range radar sensor, an ultra-wideband radar sensor, and a microwave sensor. The traffic light detection sensor 107 may be configured to scan an area in front of a vehicle to detect a traffic control device. The traffic light detection sensor 107 may also be configured to detect one or more vehicles in front of the vehicle on which the traffic light detection sensor 107. The traffic light detection sensor 107 may provide information on one or more from among a distance between a vehicle and a traffic control device, a height of a vehicle in front of the vehicle on which it is mounted, a height of the traffic control device, a position of the traffic control device a status of the traffic control device, etc. The status may indicate a color or pattern of light being emitted by the traffic control device.

The communication device 108 may be used by the apparatus that optimizes traffic control device detection 100 to communicate with various types of external apparatuses according to various communication methods. The communication device 108 may be used to send/receive information including information on a location of a vehicle, information on a location of a traffic control device, and mapping information used by a vehicle to control its path. The communication device 108 may also be used to receive information on vehicle dynamics such as vehicle velocity and/or vehicle trajectory to/from the controller 101 of the apparatus that that optimizes traffic control device detection 100.

The communication device 108 may include various communication modules such as one or more from among a telematics unit, a broadcast receiving module, a near field communication (NFC) module, a GPS receiver, a wired communication module, or a wireless communication module. The broadcast receiving module may include a terrestrial broadcast receiving module including an antenna to receive a terrestrial broadcast signal, a demodulator, and an equalizer, etc. The NFC module is a module that communicates with an external apparatus located at a nearby distance according to an NFC method. The GPS receiver is a module that receives a GPS signal from a GPS satellite and detects a current location. The wired communication module may be a module that receives information over a wired network such as a local area network, a controller area network (CAN), or an external network. The wireless communication module is a module that is connected to an external network by using a wireless communication protocol such as IEEE 802.11 protocols, WiMAX, Wi-Fi or IEEE communication protocol and communicates with the external network. The wireless communication module may further include a mobile communication module that accesses a mobile communication network and performs communication according to various mobile communication standards such as $3^{rd}$ generation (3G), $3^{rd}$ generation partnership project (3GPP), long-term evolution (LTE), Bluetooth, EVDO, CDMA, GPRS, EDGE or ZigBee.

According to another exemplary embodiment, the controller 101 of the apparatus that optimizes traffic control device detection 100 may be configured to determine whether a first vehicle is traveling to an intersection with a traffic control device and whether the first vehicle is within a predetermined distance of the intersection, in response to determining that the first vehicle is traveling to the intersection with the traffic control device and that the first vehicle is within the first predetermined distance of the intersection, scan for the traffic control device, control the first vehicle to increase a distance between the first vehicle and a second vehicle in front of the first vehicle if the scanning fails to detect the traffic control device, and control the first vehicle to maintain the distance between the first vehicle and the second vehicle in front of the first vehicle if the scanning detects the traffic control device.

The controller 101 of the apparatus that optimizes traffic control device detection 100 may be configured to control the first vehicle to stop the first vehicle at the intersection if the scanning fails to detect the traffic control device and the first vehicle is within a second predetermined distance of the intersection.

The controller 101 of the apparatus that optimizes traffic control device detection 100 may be configured to detect a height of the second vehicle in front of the first vehicle. Based on the height, the controller 101 may be configured to control the first vehicle to increase the distance between the first vehicle and the second vehicle by increasing the distance between the first vehicle and second vehicle.

The controller 101 of the apparatus that that optimizes traffic control device detection 100 may be configured to control the first vehicle to increase the distance between the first vehicle and the second vehicle by increasing the distance between the first vehicle and second vehicle at a rate based on a distance between the first vehicle and the intersection.

The controller 101 of the apparatus that that optimizes traffic control device detection 100 may be configured to scan for the traffic control device by detecting a traffic control device in an image of taken by a vehicle sensor.

The controller 101 of the apparatus that that optimizes traffic control device detection 100 may be configured to control the first vehicle to increase the distance between the first vehicle and the second vehicle in front of the first vehicle if the scanning fails to detect the traffic control device by decelerating the first vehicle.

The controller 101 of the apparatus that that optimizes traffic control device detection 100 may be configured to decelerate the first vehicle by performing at least one from among initiating a brake of the first vehicle, releasing a throttle of the first vehicle, or decreasing a power output of the first vehicle.

The controller 101 of the apparatus that optimizes traffic control device detection 100 may be configured to determine whether the first vehicle is traveling to the intersection with the traffic control device and whether the first vehicle is within the predetermined distance of the intersection by receiving location information of the first vehicle, determining a heading of the first vehicle, comparing the location information to map information including the location of the traffic control device, and determining that the first vehicle is traveling to the intersection with the traffic control device and that the first vehicle is within the predetermined distance based on the determined heading of the first vehicle and the comparing of the location information to the map information.

The controller 101 of the apparatus that that optimizes traffic control device detection 100 may be configured to detect a height of the traffic control device. Based on the height of the traffic control device, the controller 101 may be configured to control the first vehicle to increase the distance between the first vehicle and the second vehicle by increasing the distance between the first vehicle and second vehicle.

The controller 101 of the apparatus that that optimizes traffic control device detection 100 may be configured to control the first vehicle to maintain the distance between the first vehicle and the second vehicle in front of the first vehicle if the scanning detects the traffic control device by stopping the vehicle if the traffic control device indicates a yellow signal and the vehicle is within a third predetermined distance from the intersection. According to an example, the vehicle may not be able to determine how long a yellow light or signal indicating the vehicle must slow down and prepare to stop has been provided by the traffic control device. Thus, the vehicle must prepare to stop at the intersection once the signal is detected and the signal indicates a slow down or stop condition.

Figure 2:
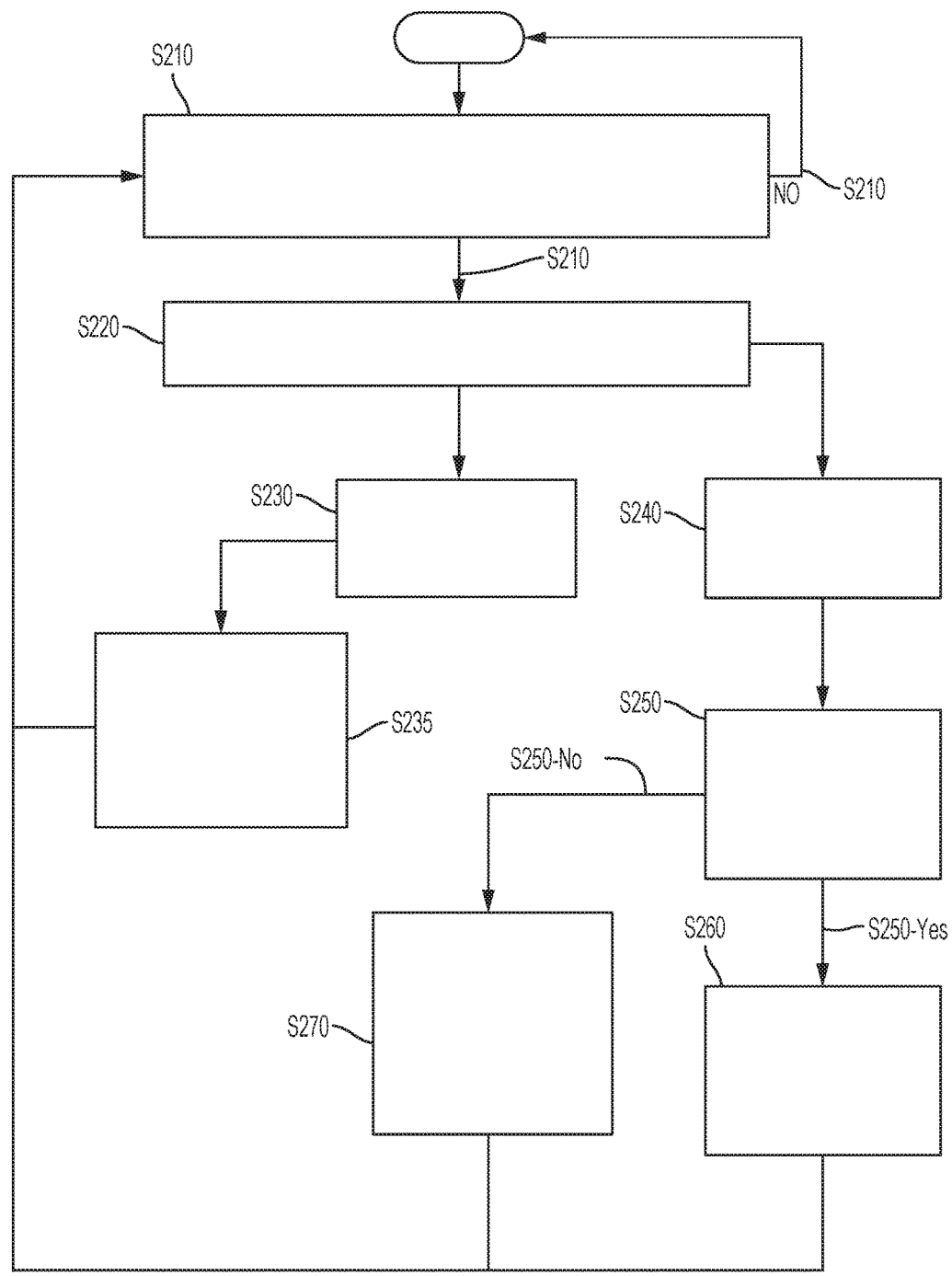
FIG. 2 shows a flowchart for a method of optimizing traffic control device detection according to an exemplary embodiment.

FIG. 2 shows a flowchart for a method of optimizing traffic control device detection according to an exemplary embodiment. The method of FIG. 2 may be performed by the apparatus that that optimizes traffic control device detection 100 or may be encoded into a computer readable medium as instructions that are executable by a computer to perform the method.

Referring to FIG. 2, if it is determined that the first vehicle is traveling to an intersection with a traffic control device and that the first vehicle is within a predetermined distance of intersection in operation S210 and operation S210—Yes, scanning for a traffic control device is performed in operation S220. Otherwise (operation S210—No), the process resets.

If the scanning detects a traffic control device (operation S220-operation S230), a first vehicle is controlled to maintain the distance between the second vehicle in front of the first vehicle in operation S235. According to one example, the distance being maintained is a distance greater than or equal to a predetermined minimum safe distance from the second vehicle.

If the scanning fails to detect a traffic control device (operation S220-operation S240), it is determined whether the first vehicle is within a second predetermined distance of the intersection (operation S250). If it is determined that the first vehicle is within a predetermined distance of the intersection (operation S250—Yes), the first vehicle stops at the intersection (operation S260). Otherwise (operation S250—No), the first vehicle is controlled so as to increase a distance between the first vehicle and a second vehicle traveling in front of the first vehicle in operation S270.

Figure 3:
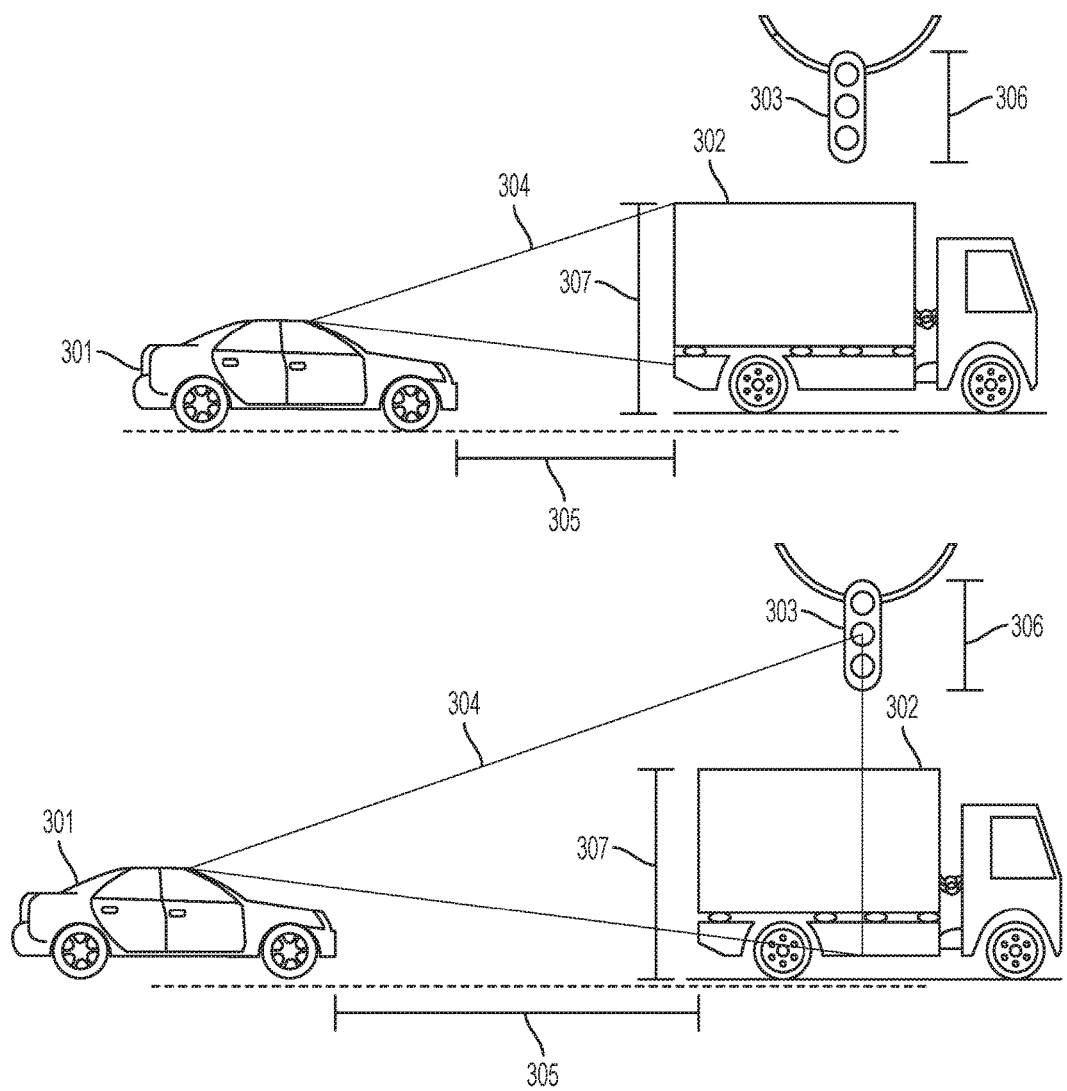
FIG. 3 shows illustrations of controlling a vehicle based on scanning for a traffic control device at an intersection according to an aspect of an exemplary embodiment.

FIG. 3 shows illustrations of controlling a vehicle based on scanning for a traffic control device at an intersection according to an aspect of an exemplary embodiment. Referring to the top image of FIG. 3, a first vehicle 301 is approaching an intersection with a traffic control device 303. The field of view 304 of a sensor on the first vehicle 301 is obstructed by a second vehicle 302 (e.g., a truck). In particular, the distance 305 between the first vehicle 301 and the second vehicle 302 as well as the height 306 of the traffic control device 303 and the height 307 of the second vehicle 302 may affect the field of view 304 of a sensor on the first vehicle 301. In this case, the height 306 of the traffic control device 303 may be the height with above the second vehicle 302 or the height above the ground.

As a result, as shown in the second image of FIG. 3, the first vehicle 301 may be controlled to increase the distance 305 between the first vehicle 301 and the second vehicle 302 (e.g., a truck) so that the field of view 304 of a sensor on the first vehicle is capable of detecting the traffic control device 303.

The processes, methods, or algorithms disclosed herein can be deliverable to/implemented by a processing device, controller, or computer, which can include any existing programmable electronic control device or dedicated electronic control device. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

One or more exemplary embodiments have been described above with reference to the drawings. The exemplary embodiments described above should be considered in a descriptive sense only and not for purposes of limitation. Moreover, the exemplary embodiments may be modified without departing from the spirit and scope of the inventive concept, which is defined by the following claims.

What is claimed is:

1. A method for optimizing traffic control device detection, the method comprising:
   determining whether a first vehicle is traveling to an intersection with a traffic control device and whether the first vehicle is within a predetermined distance of the intersection;
   in response to determining that the first vehicle is traveling to the intersection with the traffic control device and that the first vehicle is within the first predetermined distance of the intersection, scanning for the traffic control device;
   controlling the first vehicle to increase a distance between the first vehicle and a second vehicle in front of the first vehicle if the scanning fails to detect the traffic control device; and
   controlling the first vehicle to maintain the distance between the first vehicle and the second vehicle in front of the first vehicle if the scanning detects the traffic control device.

2. The method of claim 1, further comprising:
   controlling the first vehicle to stop the first vehicle at the intersection if the scanning fails to detect the traffic control device and the first vehicle is within a second predetermined distance of the intersection.

3. The method of claim 1, further comprising:
   detecting a height of the second vehicle in front of the first vehicle,
   wherein the controlling the first vehicle to increase the distance between the first vehicle and the second vehicle comprises increasing the distance between the first vehicle and second vehicle based on the height of the second vehicle.

4. The method of claim 1, wherein the controlling the first vehicle to increase the distance between the first vehicle and the second vehicle comprises increasing the distance between the first vehicle and second vehicle at a rate based on a distance between the first vehicle and the intersection.

5. The method of claim 1, wherein the scanning for the traffic control device comprises detecting a traffic control device in an image of taken by a vehicle sensor.

6. The method of claim 1, wherein the controlling the first vehicle to increase the distance between the first vehicle and the second vehicle in front of the first vehicle if the scanning fails to detect the traffic control device comprises decelerating the first vehicle.

7. The method of claim 6, wherein the decelerating the first vehicle comprises performing at least one from among initiating a brake of the first vehicle, releasing a throttle of the first vehicle, or decreasing a power output of the first vehicle.

8. The method of claim 1, further comprising detecting a height of the traffic control device,
   wherein the controlling the first vehicle to increase the distance between the first vehicle and the second vehicle comprises increasing the distance between the first vehicle and second vehicle based on the height of the traffic control device.

9. The method of claim 1, wherein the determining whether the first vehicle is traveling to the intersection with the traffic control device and whether the first vehicle is within the predetermined distance of the intersection comprises:
   receiving location information of the first vehicle;
   determining a heading of the first vehicle;
   comparing the location information to map information including the location of the traffic control device;
   determining that the first vehicle is traveling to the intersection with the traffic control device and that the first vehicle is within the predetermined distance based on the determined heading of the first vehicle and the comparing of the location information to the map information.

10. A non-transitory computer readable medium comprising computer instructions executable to perform the method of claim 1.

11. An apparatus that optimizes traffic control device detection, the apparatus comprising:

at least one memory comprising computer executable instructions; and at least one processor configured to read and execute the computer executable instructions, the computer executable instructions causing the at least one processor to:

determine whether a first vehicle is traveling to an intersection with a traffic control device and whether the first vehicle is within a predetermined distance of the intersection;

in response to determining that the first vehicle is traveling to the intersection with the traffic control device and that the first vehicle is within the first predetermined distance of the intersection, scan for the traffic control device;

control the first vehicle to increase a distance between the first vehicle and a second vehicle in front of the first vehicle if the scanning fails to detect the traffic control device; and control the first vehicle to maintain the distance between the first vehicle and the second vehicle in front of the first vehicle if the scanning detects the traffic control device.

12. The apparatus of claim 11, wherein the computer executable instructions cause the at least one processor to control the first vehicle to stop the first vehicle at the intersection if the scanning fails to detect the traffic control device and the first vehicle is within a second predetermined distance of the intersection.

13. The apparatus of claim 11, wherein the computer executable instructions cause the at least one processor to detect a height of the second vehicle in front of the first vehicle, wherein the computer executable instructions cause the at least one processor to control the first vehicle to increase the distance between the first vehicle and the second vehicle by increasing the distance between the first vehicle and second vehicle based on the height of the second vehicle.

14. The apparatus of claim 11, wherein the computer executable instructions cause the at least one processor to control the first vehicle to increase the distance between the first vehicle and the second vehicle by increasing the distance between the first vehicle and second vehicle at a rate based on a distance between the first vehicle and the intersection.

15. The apparatus of claim 11, wherein the computer executable instructions further cause the at least one processor to scan for the traffic control device by detecting a traffic control device in an image of taken by a vehicle sensor.

16. The apparatus of claim 11, wherein the computer executable instructions further cause the at least one processor to control the first vehicle to increase the distance between the first vehicle and the second vehicle in front of the first vehicle if the scanning fails to detect the traffic control device by decelerating the first vehicle.

17. The apparatus of claim 16, wherein the computer executable instructions further cause the at least one processor to decelerate the first vehicle by performing at least one from among initiating a brake of the first vehicle, releasing a throttle of the first vehicle, or decreasing a power output of the first vehicle.

18. The apparatus of claim 11, wherein the computer executable instructions further cause the at least one processor to control the first vehicle to maintain the distance between the first vehicle and the second vehicle in front of the first vehicle if the scanning detects the traffic control device by stopping the vehicle if the traffic control device indicates a yellow signal and the vehicle is within a third predetermined distance from the intersection.

19. The apparatus of claim 11, wherein the computer executable instructions further cause the at least one processor to determine whether the first vehicle is traveling to the intersection with the traffic control device and whether the first vehicle is within the predetermined distance of the intersection by:

receiving location information of the first vehicle;

determining a heading of the first vehicle;

comparing the location information to map information including the location of the traffic control device; and determining that the first vehicle is traveling to the intersection with the traffic control device and that the first vehicle is within the predetermined distance based on the determined heading of the first vehicle and the comparing of the location information to the map information.

20. The apparatus of claim 11, wherein the computer executable instructions further cause the at least one processor to detect a height of the traffic control device, wherein the computer executable instructions further cause the at least one processor to control the first vehicle to increase the distance between the first vehicle and the second vehicle by increasing the distance between the first vehicle and second vehicle based on the height of the traffic control device.

* * * * *